(12) United States Patent
Meyer

(10) Patent No.: US 6,222,743 B1
(45) Date of Patent: Apr. 24, 2001

(54) POWER FACTOR CORRECTION CIRCUIT

(75) Inventor: David A. Meyer, Verndale, MN (US)

(73) Assignee: Honeywell Inc., Morristown, NJ (US)

( * ) Notice: Subject to any disclaimer, the term of this patent is extended or adjusted under 35 U.S.C. 154(b) by 0 days.

(21) Appl. No.: 09/104,954

(22) Filed: Jun. 25, 1998

(51) Int. Cl.[7] .................................................. H02M 1/12
(52) U.S. Cl. .................................................. 363/41; 363/89
(58) Field of Search .......................... 363/41, 89, 126, 363/21, 26, 34–37

(56) References Cited

U.S. PATENT DOCUMENTS

| | | | | |
|---|---|---|---|---|
| 4,459,651 | * | 7/1984 | Fenter | 363/21 |
| 4,540,931 | * | 9/1985 | Hahn | 323/264 |
| 5,592,128 | * | 1/1997 | Hwang | 331/61 |

OTHER PUBLICATIONS

"Product and Applications Handbook 1995–1996" Integrated Circuits Unitrode.

* cited by examiner

Primary Examiner—Peter S. Wong
Assistant Examiner—Gary L. Laxton
(74) Attorney, Agent, or Firm—Kris T. Fredrick

(57) ABSTRACT

A power factor correction circuit which employs a full wave rectified input wave form made up of plurality of short duration pulses applied across a transformer to charge a capacitor during a major portion of the input voltage wave and produce a DC output signal at a lower voltage than the input voltage.

18 Claims, 2 Drawing Sheets

POWER FACTOR CORRECTION CIRCUIT

BACKGROUND OF THE INVENTION

1. Field of the Invention

The present invention relates generally to power factor correction circuits, and more particularly to a power factor corrector which uses a high frequency current mode regulator integrated circuit to provide peak current limiting at a high frequency rate on a cycle by cycle basis. Input power line isolation is obtained with output direct current voltages that can be desirably less than the rectified input voltage.

2. Description of the Prior Art

Power factor correction circuits are known in the art. For example a UC3852 circuit manufactured by Unitrode Corporation and described in its "Products and Applications" handbook for 1995 and 1996 on pages 10–269 to 10–284. Such a circuit utilizes a full wave rectified input signal such as is shown in FIG. 1 as curve 10.

Cycling from point A to B to C to D to E to F to G etc. This signal is applied across an inductance/capacitance circuit so that the capacitor, which produces the output voltage, is charged up during the time from point A to point B at which point the current decays to point J where it is then further charged to point D. This charging/decaying curve continues to point K to point F to point L etc. to provide a ripple curve of a substantially DC voltage for use by the down stream equipment. However, using this as an input signal, and without power factor correction, the input current would lead the input voltage to produce a power factor of about 0.85. This shows that only about 85% of the output signal is driven from the input signal thus producing a power factor of about 0.85. Increasing the width under curve 10 between points J and D; and between Points K and F would increase the power factor. However, increasing the area under these points would bring point J down curve 10 towards point C and point K down the curve towards point E which would badly increase the amount of ripple in the output voltage.

Utilizing a power factor correction circuit such as the above mentioned UC3852, the power factor can be corrected to 0.998 and thus, the output signal is driven by the line input during nearly 100% of the time.

One disadvantage to circuits such as the UC3852 is that the DC output circuit is not isolated from the AC input circuit which could produce a short circuit if a diode rectifier were used at the input. Another disadvantage for circuits such as the UC3852, is that the output voltage is considerably higher than the input voltage and, in fact, may be more than twice as high. This increased output voltage is undesirable for many situations such as, for example, supplying power to aircraft components because most aircraft use a 115 volt AC source and a 28 volt DC source. Accordingly, the output of the power factor correction circuit using the UC3852 could be as high as 230 DC volts when it would be desirable for the output to be a little higher than 28 volts.

SUMMARY OF THE INVENTION

The present invention solves these and other needs by providing a circuit which is switched "on" above a first threshold level and then very rapidly switches "off" and "on" to produce a large number of short conduction periods during the envelope of the sine wave until a second threshold level is reached at which time the circuit is switched "off" until the first threshold level is again reached. The first and second thresholds can be set to provide a conduction period which exceeds 95% of the input signal and thus produces a correction factor greater than 0.95. Furthermore, the output voltage may be controlled to below the input voltage level and, in the preferred embodiment, the output is about 30 to 35 volts with an input signal of 115 volts which is close to ideal for use with aircraft components using 28 volt supplies. Other advantages of peak current limiting are reduced transients reflected back to the AC input power; faster response to fault or short circuit conditions in the output load and use of lower voltage rating MOS transistors all of which lead to improved circuit performance including better power supply efficiency.

DETAILED DESCRIPTION

Figure 1:
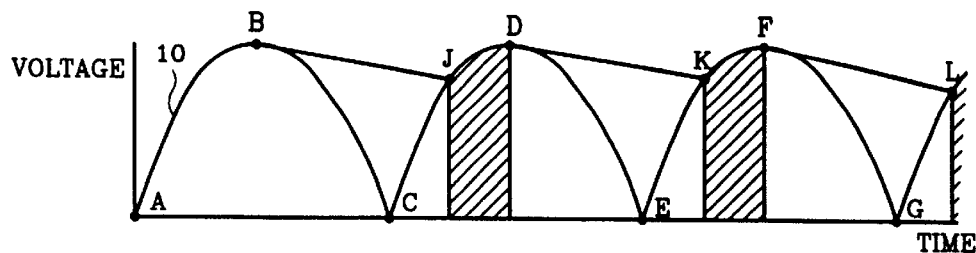
FIG. 1 is a graph showing the input signal curve used in the power factor corrector of the prior art.
Figure 2:
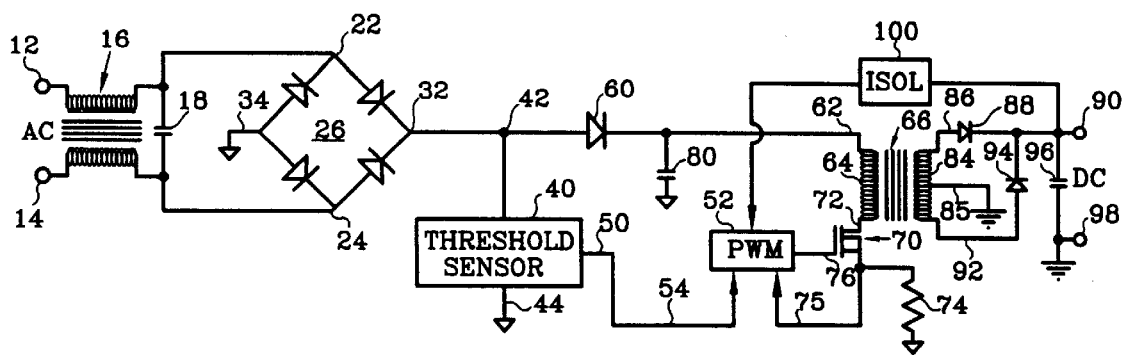
FIG. 2 is a simplified schematic diagram of the power factor correction circuit according to the present invention.

Referring to FIG. 2, AC voltage is applied to input terminals 12 and 14 and passes through an interference suppression inductance 16 and capacitor 18 to be applied to the upper and lower terminals 22 and 24 of a rectifier circuit 26. The output of rectifier circuit 26 is taken from terminal 32 and grounded terminal 34 and the rectified voltage, similar to the curve 10 of FIG. 1, is applied to a threshold sensor 40 at its input terminal 42 and grounded terminal 44.

Threshold sensor 40 operates to sense the magnitude of the input voltage and to produce an output signal at an output terminal 50 and present it to a pulse width modulator 52 via a connection 54 whenever the voltage is greater than a first threshold value. This output signal is removed whenever the threshold sensor senses that the input voltage has fallen below a second threshold value. As will be explained in connection with FIG. 3, the thresholds may be set to provide a power factor of any desired size.

The rectified signal from rectifier circuit 26 is also applied through a diode 60 to the upper input terminal 62 on a primary winding 64 of a transformer 66. A FET switch 70 has its drain terminal connected to the lower terminal 72 of winding 64. The source terminal of FET switch 70 is connected through a resistor 74 to ground so as to provide a sample of the FET switch 70 current to the pulse width modulator 52 by a connection 75. The gate terminal of FET switch 70 is connected to receive a signal from the pulse width modulator 52 by a connection 76. The result is that the pulse width modulator 52 controls the ON-OFF o f the FET switch 76 and thus the current flow through primary winding 64 of transformer 66. A capacitor 80 is also connected between t he upper terminal 62 of winding 64 and ground to provide switch transient filtering to prevent switch transients from being reflected back into the AC input power.

Transformer 66 has a secondary winding 84 with a grounded center tap 85, an upper terminal 86 connected through a diode 88 to an output terminal 90 and a lower terminal 92 connected through a diode 94 to output terminal 90. A capacitor 96 is connected between output terminal 90 and a grounded output terminal 98. An isolation circuit 100 is connected between output terminal 90 and the pulse width modulator 52 to prevent current flow between the output circuit on the right side of transformer 66 and the input circuit on the left side of transformer 66. Note also that the ground connections to center tap 84 and to output terminal 98 are different than the ground connections to resistor 74, capacitor 80, threshold sensor 44 and terminal 34 of rectifier circuit 26 for the same reason.

Figure 3:
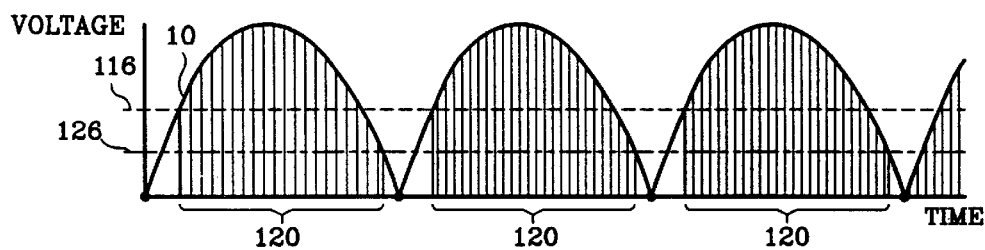
FIG. 3 is a graph showing the input signal curve used in the power factor corrector of the present invention; and, FIG. 4 is a more complete schematic diagram of the power factor correction circuit of the present invention.

With reference to FIGS. 2 and 3, the operation of power factor correction circuit of FIG. 2 will be explained. The signal applied across threshold sensor 40 will be a full wave rectified signal such as is seen in FIG. 3 as curve 110. As will be further explained in connection with FIG. 4, threshold circuit 40 senses when the rising voltage on curve 110 reaches a first threshold value shown in FIG. 3 as dashed line 116. As soon as the voltage reaches the threshold 116, threshold sensor 40 produces an output signal on line 54 to the pulse width modulator 52 and pulse width modulator 52 begins to run turning FET switch 70 rapidly on and off. Current flows through transformer winding 64 of transformer 66 in short duration pulses as shown in FIG. 3 by the plurality of vertical lines 120 seen occupying most of the space in each of the envelopes of curve 110. These short pulses are transmitted through the transformer 66 and rectified by diodes 88 and 94 to build up a voltage across capacitor 96 to produce a DC output signal between terminals 90 and 98. When the threshold sensor 40 senses that the magnitude of the voltage on input curve 110 has decreased to a second threshold value represented by dash-dot line 126, the signal to pulse width modulator 52 disappears and the production of short duration pulses stops until the next envelope of curve 110 again reaches the threshold 116. It is seen that the output signal at terminals 90 and 98 is driven by the input voltage throughout a major portion of each envelope of curve 110. The pulses 120 of FIG. 3 have an "off" time of about 0.5 microseconds and an "on" time of approximately 5 microseconds. The "on" time varies with the loads, being longer for higher loads and shorter for smaller loads. The "off" time is a function of the design, being set to insure sufficient time for the MOSFETS 356 and 358 to reach the "off" state. The maximum "on" time is also set by the designer to correspond to the frequency of operation of the time pulse width modulator 262. Variations in the "on" time are controlled by the load, the pulse width modulator 52 voltage and the current sense circuitry. The values of thresholds 116 and 126 are controlled by the turns ratio of the transformer 66 and may be set to produce almost any percentage of "on" time. In FIG. 3 it appears that the pulses occupy about 90 percent of the envelope so that the power factor would probably be above 0.9 in this case. In actual practice, power factors of over 95% are preferred.

Figure 4:
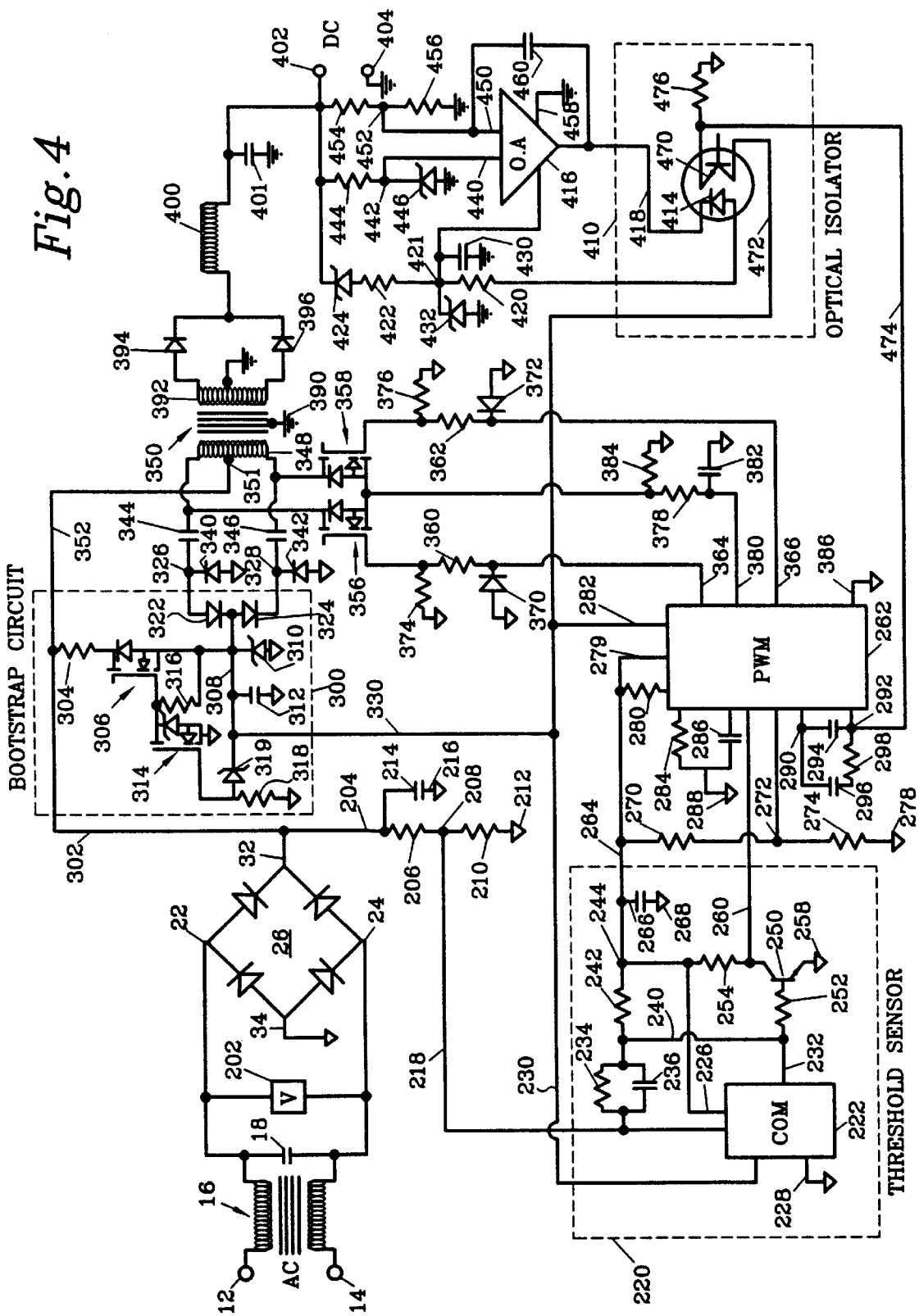

A schematic diagram of one embodiment of an actual circuit used for power factor correction using the present invention is seen in FIG. 4. In FIG. 4, the AC input is substantially the same as in FIG. 2 and has retained the same reference numerals. A metal oxide varister 202 is shown connected across the input to the diode bridge 26 to protect against transients. The output of the diode bridge 26 at junction 32 is connected by a line 204 through a resistor 206, a junction point 208 and a resistor 210 to a signal ground at 212. A capacitor 214 is connected from line 204 to signal ground at 216. The purpose of this circuit is to provide a sample of the full wave rectified AC input sine wave. From junction point 208 the sampled voltage is conducted by a line 218 to a threshold sensor circuit, shown by dashed line 220. Inside threshold sensor 220, the sampled voltage on line 218 is presented to a comparator circuit 222 which also receives a reference signal on a line 226. Comparator 222 is connected to signal ground at 228 and receives input power on a line 230. The output of comparator 222 is on a line 232. The sampled voltage on line 218 is also presented to a capacitor 236 and a resistor 234 connected in parallel and thence to the output line 232 via a line 240. The voltage on line 240 is fed through a resistor 242 to a junction point 244. The circuit combination of resistors 206, 210, 234 and 242 in combination with the reference voltage on line 230 are used to set the threshold levels 116 and 126 of FIG. 3.

An NPN transistor 250 has its base connected through a resistor 252 to the output line 232, has its collector connected through a resistor 254 to the junction point 244 and has its emitter connected to signal ground at 258. The output of the threshold circuit is taken from the collector of transistor 250 on a line 260 and is presented to a pulse width modulator circuit shown as box 262. Junction point 244 is connected to an output line 264 which is connected through a capacitor 266 to signal ground at 268, and through a resistor 270, a junction point 272 and a resistor 274 to signal ground at 278. An output 279 of pulse width modulator 262 is connected to line 264 and provides the reference voltage on line 226 for the comparator 222 and this voltage is also fed back through a resistor 280 as an input for the pulse width modulator 262.

In operation, comparator 222 compares the voltage on line 230 with the sampled voltage on line 218. Whenever, the voltage on line 230 is greater than that on line 218, an output on line 232 is low and so the base of transistor 250 is low which turns the pulse width modulator 262 off. Whenever the voltage on line 230 is less than the voltage on line 218, the output on line 232 is high, the base of transistor 232 is high and the pulse width modulator 262 is turned on.

Pulse width modulator 262 receives a power up signal from line 230 via line 282. A resistor 284 and capacitor 286 are connected from pulse width modulator 262 to signal ground at 288. Resistor 284 in combination with capacitor 286 determines the operating frequency of the pulse width modulator 262 and the capacitor 286 has the additional function of determining the "off" time between two FET's to be discussed below. Pulse width modulator 262 has a pair of terminals connected to junction points 290 and 292 and a capacitor 294 in parallel with a capacitor 296 and a resistor 298 is connected across junction points 290 and 292. The combination of capacitors 294 and 296 with resistor 298 form the control loop stability criteria.

As explained above, pulse width modulator 262 operates to provide a plurality of very rapid pulses such as are shown by reference numeral 120 in FIG. 3. The initial power to start the operation of pulse width modulator 262 is obtained from a bootstrap circuit shown by dashed lines 300. Bootstrap circuit 300 receives the output signal of the diode bridge 26 by a line 302 connected through a resistor 304 to the drain terminal of an FET switch 306. The source terminal of FET 306 is connected to a common line 308 and through a zener diode 310 and a capacitor 312 to signal ground. The gate terminal of FET 306 is connected to the drain terminal of a FET switch 314 and, through a resistor 316, to common line 308. The source terminal of FET 314 is connected to signal ground and the gate terminal of FET 314 is connected through a resistor 318 to signal ground and through a zener diode 319 to common line 308. Common line 308 is connected to the cathode terminals of a pair of diodes 322 and 324 the anodes of which are connected to junction points 326 and 328 respectively. Finally, common line 308 is connected by a line 330 to line 230 to supply power thereto.

Junction points 326 and 328 are connected through diodes 340 and 342 respectively to signal ground and also through capacitors 344 and 346 to opposite ends of a center tapped primary winding 348 of a transformer 350. The center tap 351 is connected to the full wave rectified signal on line 302 by a connection 352 and the upper and lower ends of winding 348 are connected to the drain terminals of a pair of FET switches 356 and 358 respectively. The gates of FET's 356 and 358 are connected through resistors 360 and 362 respectively to output terminals 364 and 366 respectively of the pulse width modulator 262. Diodes 370 and 372 in parallel with resistors 374 and 376 are connected on either side of resistors 360 and 362 respectively to signal ground to provide gate protection circuits for FET's 356 and 358 respectively. Similarly, the source terminals of FET's 356 and 358 are connected together and through a resistor 378 to output terminal 380 of pulse width modulator 262. Capacitor 382 and resistor 384 are connected from either side of resistor 378 to signal ground to provide a source protection circuit for FET's 356 and 358. A signal ground connection 386 is provided for pulse width modulator 262.

Resistors 270 and 274 used in conjunction with reference voltage on line 264 determine the peak current which the FET's 356 and 358 are allowed to pass. This peak current is obtained by sampling, on a pulse by pulse basis, the current through resistor 384. Resistor 378 and capacitor 382 form a filter network to remove current spikes or transients associated with the turning on and off of FET's 356 and 358. Diode 370 and resistors 360 and 374 provide transient protection for FET 356 and the pulse width modulator 262 output circuitry on connection 364. Similarly, diode 372 and resistors 362 and 376 provide transient protection for FET 358 and pulse width modulator 262 output circuitry on connection 366.

At startup, diode circuit 26 produces a full wave rectified sine wave similar to curve 110 of FIG. 3. As the initial half cycle amplitude increases, it causes current to flow through line 302, resistor 304, FET 306 and conductors 308, 330 and 282 to provide the initial startup power for the pulse width modulator 262. As the voltage raises above a level set by Zener diode 319 and the gate threshold voltage of FET 314, it causes FET 314 to turn on. As FET 314 turns on, its drain voltage drops causing FET 306 to turn off. Concurrently, with the startup of pulse width modulator 262, and the initiation of Gate Drive signals to FET's 356 and 358, current is caused to flow alternately through the drains of FET's 356 and 358. These currents provide the drive power to transformer 350. A reduced portion of the drain currents of FET's 356 and 358 is also applied to capacitors 344 and 346 and then through diodes 322 and 324 to conductor 308. Conductor 308 now continues to supply power to the pulse width modulator 262 and the bootstrap circuit is disconnected.

As pulse width modulator 262 operates, current flows alternately from outputs 364 and 366 to the gates of FET's 356 and 358. The drains of FET's 356 and 358 operate to cause the current to flow alternately from the center tap 351 to opposite ends of transformer winding 348. The result is a full wave signal with short duration pulses such as curve 110 of FIG. 3 passing through transformer 350.

Transformer 350 has a Faraday shield between its windings connected to power ground as at 390 (not signal ground since isolation between the two sides of transformer 350 is desired). The secondary winding 392 of transformer 350 is center tapped to output power ground and the ends thereof are connected through diodes 394 and 396 to an inductor 400 and a capacitor 401 to output power ground. The build up of voltage on capacitor 401 produces the desired DC output voltage which is presented to an output terminal 402. An output terminal 404 is connected to output power ground. Terminals 402 and 404 provide the power for the DC equipment in the aircraft.

As mentioned, an isolator is used to disconnect the output circuit (i.e. the circuitry beyond transformer 350) from the input circuitry (prior to transformer 350). An isolator is necessary to prevent the ground system associated with the pulse width modulator from being connected to the common ground, which could cause a short circuit in the AC input. In the preferred embodiment an optical isolator shown by dashed lines 410 is used. Optical isolator 410 comprises a cathode or light emitting diode (LED) 414 connected to the output of an operational amplifier 416 by a line 418 and to the DC output terminal 402 by a resistor 420, a junction point 421, a resistor 422 and a zener diode 424. The junction point 421 is connected to power ground through a capacitor 430 and a zener diode 432 connected in parallel. Zener diode 432 provides a fixed voltage which is used to power operational amplifier 416 and the anode of LED 414. Zener diode 424 and resistor 422 are used to reduce the output voltage from output 402 down to the level determined by Zener diode 432.

A reference input for operational amplifier 416 is provided on a line 440 connected to a junction point 442 between a resistor 444 connected to the output terminal 402 and a zener diode 446 connected to power ground. A second input of operation amplifier 416 is provided on a line 450 connected to a junction point 452 between a resistor 454 connected to the output terminal 402 and a resistor 456 connected to output power ground. The second input provides a sample of the DC output voltage. Operational amplifier 416 has an output power ground connection 458. A feed back capacitor 460 is connected between the output line 418 and the second input on line 450 and provides part of the frequency compensation for the power supply. Operational amplifier 416 compares the DC levels on inputs 440 and 450 and an amplified version of this signal is applied to the LED 414 of optical isolator 410 causing the LED radiation to increase or decease depending on the error signal.

The output of optical isolator 410 is obtained by an NPN junction 470 having a base that is open, and an emitter connected to the power line 230 by a line 472 and a collector connected to the junction point 292 of the pulse width modulator 262 by a line 474 and through a resistor 476 to signal ground.

The line 474 completes the voltage feedback circuit needed by the pulse width modulator 262 to provide a regulated DC voltage at the DC output terminal 402. Thereafter, the pulse width modulator continues to operate with power derived by way of circuit path 308, diodes 322 and 324 and capacitors 344 and 346. The threshold sensor senses the voltages and when the threshold reaches a value such as 116 in FIG. 3, the pulse width modulator oscillates to produce the short pulse width signals 120. During this time the signal through transformer 350 causes a DC output build up on output terminal 402. When the voltage comparison falls below a value represented by line 126 in FIG. 3, the pulse width modulator stops and the voltage at output terminal 402 decays some. When the voltage again reaches the 116 level, the procedure repeats to maintain the DC voltage between output terminals 402 an 404 at a value determined by the voltage of Zener diode 446 and the values of resistors 454 and 456 which, it is noted, is lower than the input voltage because of the turns ratio of the transformer 350 and the values chosen for resistors 454 and 456. A unique and desirable feature of the power factor correction circuit of the present invention is that the output DC voltage is considerably less than the input voltage. This is because the output DC voltage is a function of the transformer 350 turns ratio and the ratio of output voltage sense resistors 454 and 456. Additional design factors which influence the output voltage are the "on" threshold 116 and the "off" threshold 126 of FIG. 3. Within these operating thresholds, the "on" current of MOSFETs 356 and 358 respectively, is sensed by resistor 384. The turn on spiking is filtered by resistor 378 and capacitor 382 and this filtered signal is applied to the current sense circuitry of the pulse width modulator 262 via connection 380. This current sense circuitry operates continuously during the MOSFET 356 or 358 "on" time. Should the current, during this time, exceed the threshold of the pulse width modulator's 262 internal level, the pulse width modulator 262 will terminate that cycle, typically within 200 to 300 nanoseconds.

The optical isolator 410 operates the pulse width modulator 262 for control of the portion of the back output voltage appearing at output terminal 402. It is seen that the desired peak current limiting at a high frequency rate on a cycle by cycle basis is obtained, the desired input power line isolation is obtained and output direct current voltages can be desirably less than the rectified input voltage. In some applications, it might be desirable to have the output voltage equal to or higher than the input voltage and if this is needed, one need only to adjust the turns ratio of transformer 350 and the values of resistors 422, 444, 454 and 456 and diode 424.

Thus since the invention disclosed herein may be embodied in other specific forms without departing from the spirit or general characteristics thereof, some of which forms have been indicated, the embodiments described herein are to be considered in all respects illustrative and not restrictive. The scope of the invention is to be indicated by the appended claims, rather than by the foregoing description, and all changes which come within the meaning and range of equivalency of the claims are intended to be embraced therein.

What is claimed is:

1. Apparatus for providing improved power factor correction comprising:
    a source of full wave rectified signal;
    a pulse width modulator for generating a series of short pulses in the full wave rectified signal;
    a threshold sensor receiving the full wave rectified signal and operable to turn the pulse width modulator on and off in accordance with predetermined signal values of the full wave rectified signal so as to control the value of the power factor;
    a transformer having a primary winding connected to receive the short pulses and having a secondary; and,
    energy storage means connected to the secondary and operable to provide a desired DC output voltage.

2. Apparatus according to claim 1 wherein the predetermined signal values comprise first and second voltages on the full wave rectified signal.

3. Apparatus according to claim 2 wherein the pulse width modulator turns on when the full wave rectified signal reaches the first voltage and turns off when the full wave rectified signal reaches the second voltage.

4. Apparatus according to claim 3 wherein the transformer has a primary winding connected to receive the full wave rectified signal as a series of pulses produced by the pulse width modulator and a secondary operable to receive the transformed pulses to supply the energy storage means.

5. Apparatus according to claim 4 further including an isolation circuit connected between the transformer secondary side and the transformer primary side to prevent a common ground connection therebetween.

6. Apparatus according to claim 5 wherein the isolation circuit is an optical isolator having an LED and a light sensor, the light sensor producing a signal derived from the LED, the LED connected to receive the output voltage and the light sensor connected to the pulse width modulator.

7. Apparatus according to claim 6 further including a bootstrap circuit connected to the source of full wave rectified signal and to the pulse width modulator and operable to provide a connection from the source of full wave rectified signal to the pulse width modulator to start the pulse width modulator upon an initial application of the full wave rectified signal.

8. Apparatus according to claim 7 wherein the bootstrap circuit is also connected to the primary winding of the transformer and after pulse width modulator initially starts, the connection between the source of full wave rectified signal and the pulse width modulator is removed and a connection between the primary winding of the transformer and the pulse width modulator is formed by the bootstrap circuit to thereafter continue the operation of the pulse width modulator.

9. Apparatus according to claim 4 wherein the turns ratio of the transformer is adjusted to cause the voltage produced in the energy storage means to be smaller than the voltage of the alternating source.

10. A power factor correction circuit comprising:
    an input circuit including:
    (a) a source of full wave rectified signal,
    (b) a transformer having primary and secondary windings, the primary winding connected to receive the full wave rectified signal;
    (c) a threshold sensing circuit connected to receive the full wave rectified signal and to produce a first output when the full wave rectified signal reaches a first threshold and a second output when the full wave rectified signal reaches a second threshold;
    (d) a pulse width modulator connected to the transformer and to the threshold sensing circuit and operable in accordance with the first and second outputs to provide pulses to the primary winding between the first and second thresholds;
    (e) an output circuit connected to the secondary winding of the transformer and including:
    A) an energy storage device connected to the secondary winding to store a DC voltage; and
    B) an output connected to the energy storage device to supply the DC voltage.

11. Apparatus according to claim 10 wherein the pulse width modulator turns on when the full wave rectified signal reaches the first threshold value and turns off when the full wave rectified signal reaches the second threshold value.

12. Apparatus according to claim 11 further including an isolation circuit connected between the input circuit and the output circuit to prevent a common ground connection between the input and output circuits.

13. Apparatus according to claim 12 wherein the isolation circuit is an optical isolator having a light emitting element connected to receive the output voltage and a light sensor to produce a signal derived from the light emitted and connected to the pulse width modulator.

14. Apparatus according to claim 13 further including a bootstrap circuit as a component of the input circuit, the bootstrap circuit connected to the source of full wave rectified signal and to the pulse width modulator and operable to provide a connection from the source of full wave rectified signal to the pulse width modulator to start the pulse width modulator upon an initial application of the full wave rectified signal.

15. Apparatus according to claim 14 wherein the bootstrap circuit is also connected to the primary winding of the transformer and after the pulse width modulator initially starts, the connection between the source of full wave rectified signal and the pulse width modulator is removed and a connection between the primary winding of the transformer and the pulse width modulator is formed by the bootstrap circuit to thereafter continue the operation of the pulse width modulator.

16. The method of providing power factor correction comprising:

supplying a full wave rectified signal to a primary winding of a transformer;

pulsing the full wave rectified signal to the primary winding between first and second thresholds of the full wave rectified signal;

transforming the pulsing full wave rectified signal in the primary winding to a secondary winding of the transformer; and producing a DC voltage in an energy storage device from the signal in the secondary winding.

17. The method of claim 16 further including:

isolating electrical components between the secondary winding side and the primary winding side.

18. The method of claim 17 further including:

adjusting the turn ratio of the primary and secondary windings so that the DC voltage is smaller than the RMS value of the alternating signal.

* * * * *